Patented Sept. 19, 1922.

1,429,650

UNITED STATES PATENT OFFICE.

FREDERICK W. SKIRROW, OF SHAWINIGAN FALLS, QUEBEC, CANADA, ASSIGNOR TO SHAWINIGAN LABORATORIES, LIMITED, OF MONTREAL, QUEBEC, CANADA.

PROCESS OF MANUFACTURING ALDEHYDES AND ANHYDRIDES FROM DIESTERS.

No Drawing.   Application filed November 8, 1920.   Serial No. 422,665.

*To all whom it may concern:*

Be it known that I, FREDERICK W. SKIRROW, a subject of the King of Great Britain, and resident of the town of Shawinigan Falls, in the Province of Quebec and Dominion of Canada, have invented certain new and useful Improvements in Processes of Manufacturing Aldehydes and Anhydrides from Diesters, of which the following is a full, clear, and exact description of the invention.

This invention relates to improvements in the process of manufacturing aldehydes and anhydrides from diesters, particularly ethylidene diesters, and the object of the invention is to provide for the decomposition of the esters in the most complete manner possible.

In the production for example of acetic anhydride from ethylidene diacetate according to the equation:—

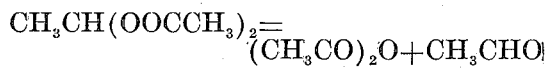

$$CH_3CH(OOCCH_3)_2 = (CH_3CO)_2O + CH_3CHO$$

by previously known methods, a serious loss of efficiency occurs, owing to the formation of considerable quantities of tar, acetic acid and vinyl acetate as the result of secondary reactions. This is particularly true when bodies such as bisulphates are used as the decomposing agent, as proposed in U. S. Patent No. 1192816, and if metaboric acid is used as the decomposing agent the reaction is so slow as to be commercially impracticable. Where potassium bisulphite or concentrated sulphuric acid are used as catalysts and the process manipulated for example as described in U. S. Patent No. 1152098, great amounts of tar are formed, also acetic acid and vinyl acetate, whereas the acetic anhydride yield is very low. One of the faults of the process, as described in the last mentioned patent, is that no mention is made of the removal of the volatile product of the reaction, namely aldehyde. If the aldehyde is not removed, the reaction being a reversible one, little ultimate decomposition is effected.

It has also been proposed to effect the decomposition of ethylidene diacetate by the use of syrupy phosphoric acid added in small amounts. This method overcomes to a considerable extent the tar formation.

According to the present invention, the decomposition is effected by the use of an oxide of sulphur, which is dissolved in the ester to be decomposed which preferably consists of a mixture of the ester and the corresponding acid. The oxide may be added to the ester before decomposition is started or may be present in the ester as a result of the method employed in producing the same. The ester containing a suitable sulphur oxide is heated to a temperature above 100° C. under an efficient column, so that aldehyde and any vinyl ester distilling out is completely removed, whereas the diester with any admixture of acid and anhydride returns from the column to the reaction vessel. It is found in practice that the heating should be so regulated that the vapors at the top of the column are maintained at a temperature ranging from 20° C. to 115° C. but preferably 40° C. to 60° C. The following examples will serve to illustrate the process but it will be understood that the process is not in any way limited to the temperature and proportions or to the esters dealt with in the example, as it may be carried out in a similar manner with other esters, such as ethylidene dibutyrate, etc., and gives butyric anhydride, etc.

*Example 1.*

Crude ethylidene diacetate prepared in accordance with copending application Ser. No. 422,885, filed November 8th, 1920, consists principally of a mixture of ethylidene diacetate and acetic acid and the small amount of sulphuric acid liberated by decomposition of the catalyst. As previously stated, the presence of sulphuric acid will result in tar formation and the sulphuric acid is therefore removed from the sphere of reaction by treating the mixture with anhydrous sodium acetate. This treatment has been already described in the previously mentioned application but with a view to preventing decomposition of the diacetate. The crude liquor containing all the products of the reaction, together with the reduced catalyst, are now distilled in a vacuum kettle and the condensate collected. The material will on analysis be found to contain from 0.1% to 0.5% of active sulphur compounds. By the word "active" is meant active with respect to the decomposition of ethylidene diacetate to acetic anhydride and acetaldehyde. 10 lbs. of material distilling at about 145° C. and consisting approximately of 90% ethylidene diacetate and 10% acetic acid is gently boiled in a vessel provided with an effective rectifying column terminating in a condenser, the top of the column being maintained at 40° to 60° C. Aldehyde, together with some vinyl acetate, distills off rapidly and, at the end of four to five hours, approximately 2.1 lbs. will have been collected and the reaction mixture will be found to consist substantially of the following; 1.8 lbs. unconverted ethylidene diacetate, 4.8 lbs. acetic anhydride and 1.1 lbs. acetic acid. This mixture may now be distilled through an efficient column for the separation of anhydride and acetic acid from ethylidene diacetate. Any vinyl acetate which forms may be recovered by distillation and recombined with acetic acid in accordance with copending application Serial Number 422,692, filed November 8th, 1920, to form ethylidene diacetate for further use.

*Example 2.*

To 10 lbs. of commercial ethylidene diacetate consisting of approximately 90% ethylidene diacetate and 10% acetic acid, there is added 0.4 ounces or 0.25% of gaseous sulphur dioxide, which is readily soluble in the material. The material is now heated as in Example 1, and subsequently treated in the manner described in Example 1 with similar results.

*Example 3.*

To 10 lbs. of commercial ethylidene diacetate, as in Example 2, there is added 0.4 ounces or 0.25% gaseous sulphur trioxide, which is readily soluble in the liquid. The material is boiled as in Example 1 and similar results are obtained.

In carrying out the decomposition of diesters according to the process just described, the formation of tar is substantially or entirely eliminated and the reaction proceeds smoothly and easily. The reaction will proceed in the manner described with pure esters or with commercial esters containing a considerable percentage of the acid from which they are formed.

While the foregoing examples relate only to the decomposition of ethylidene diacetate, for the reason that at the present time this substance is the most interesting from the commercial point of view, it will be understood that the invention is not thus limited, as the process may be carried out with other esters such as ethylidene dibutyrate and equally efficient yields of butyric anhydride, obtained.

An advantage of the present process which will be readily appreciated by manufacturing chemists is the ability to use as a catalyst for decomposition the bodies found in the crude esters, as this eliminates the necessity of first purifying the esters.

While the process is preferably carried out at ordinary atmospheric pressure, it will be understood that it may be carried out equally well at super-atmospheric and sub-atmospheric pressures.

An important step of the present process is the continuous removal of the aldehyde and any vinyl ester formed from the reaction, in order that the reaction may be reasonably complete. It is found, however, that unless the anhydride also is removed, it is not practicable to secure more than an 80% reaction. Another important feature resides in the use of only the proper amount of decomposing agent. If insufficient sulphur oxide is used, the reaction is slow, whereas if an excess, that is to say, more than about 1.0% by weight, is used the decomposition occurs but in a different manner, the result being an undesirable high yield of vinyl ester, as indicated in copending application Serial Number 422,693, filed November 8th, 1920, which deals with the manufacture of vinyl esters.

The range of temperatures given, namely 100° to 170°, is that preferred but it will be understood that the invention is not actually limited to these temperatures, as with certain diesters, the reaction will take place although slowly at temperatures below 100° and, in the same manner, with certain other esters the reaction will occur at temperatures above 170° without undesirable results. Generally, it will be understood that the higher esters which have higher boiling points require treatment at higher temperatures and, conversely, the lower esters which have comparatively lower boiling points, require treatment at the lower temperatures. In general, the ester is heated below its boiling point, the temperature being much below the boiling point at the outset of the reaction and increased as the reaction proceeds, the temperature being largely determined by the amount of distillate coming over.

Having thus described my invention, what I claim is:—

1. In the decomposition of diesters to aldehydes and anhydrides, the use of an oxide of sulphur as a catalytic or decomposing agent.

2. In the production of acetaldehyde and acetic anhydride from ethylidene diacetate, the use of an oxide of sulphur as a catalytic or decomposing agent.

3. A process of preparing aldehydes and anhydrides from diesters, which comprises heating the diesters in the presence of an oxide of sulphur.

4. A method of making aldehydes and anhydrides from diesters, which comprises heating the diesters to a temperature above 100° C. in presence of an oxide of sulphur, condensing the vaporous products of the reaction at a temperature of 40° to 60° C., returning the condensate to the reaction, collecting separately and excluding from the reaction the vapors uncondensed at 40° to 60° C.

5. A process of making acetaldehyde and acetic anhydride from ethylidene diacetate, which comprises heating the ethylidene diacetate to a temperature above 100° C. in presence of an oxide of sulphur with the formation of acetaldehyde, vinyl acetate and acetic anhydride, chilling the vapors to a temperature of 40° to 60° to condense acetic anhydride, ethylidene diacetate and the major portion of the acetic acid, returning the condensate to the reaction, and collecting separately from the reaction the acetaldehyde and vinyl acetate.

6. A method of preparing aldehydes and anhydrides from diesters, which comprises heating the diesters in presence of 0.1% to 0.5% by weight of an oxide of sulphur.

7. A method of making acetaldehyde and acetic anhydride from ethylidene diacetate, which comprises heating ethylidene diacetate in presence of 0.1% to 0.5% by weight of an oxide of sulphur.

8. A method of making aldehydes and anhydrides from diesters, which comprises heating the diesters to a temperature above 100° C. in presence of an oxide of sulphur as a catalytic or decomposing agent, fractionally condensing the vaporous products of the reaction to separate aldehyde, and returning other fractions of the condensate to the reaction.

In witness whereof, I have hereunto set my hand.

FREDERICK W. SKIRROW.